United States Patent [19]
Lorsch

[11] Patent Number: 5,903,633
[45] Date of Patent: May 11, 1999

[54] METHOD AND APPARATUS FOR PREPAID PHONE CARD ACTIVATION AND BILLING

[75] Inventor: Robert H. Lorsch, Los Angeles, Calif.

[73] Assignee: SmartTalk Teleservices, Inc., Dublin, Ohio

[21] Appl. No.: 08/584,216

[22] Filed: Jan. 4, 1996

Related U.S. Application Data

[63] Continuation-in-part of application No. 08/410,857, Mar. 27, 1995.

[51] Int. Cl.⁶ .................................................. H04M 15/00
[52] U.S. Cl. ......................... 379/114; 379/112; 379/144; 235/380; 235/382
[58] Field of Search ................................ 379/112, 113, 379/114, 121, 124, 125, 126, 127, 130, 131, 144, 155, 118, 111; 235/379, 380, 381, 382

[56] References Cited

U.S. PATENT DOCUMENTS

| | | | |
|---|---|---|---|
| 4,706,275 | 11/1987 | Kamil | 379/144 |
| 4,734,569 | 3/1988 | Kawana et al. | 235/487 |
| 5,086,457 | 2/1992 | Barraud et al. | 3794/144 |
| 5,477,038 | 12/1995 | Levine et al. | 235/380 |
| 5,504,808 | 4/1996 | Hamrick, Jr. | 379/114 |
| 5,511,114 | 4/1996 | Stimson et al. | 379/114 |
| 5,513,117 | 4/1996 | Small | 364/479 |
| 5,546,446 | 8/1996 | Tsunokawa et al. | 379/114 |
| 5,684,291 | 11/1997 | Taskett | 235/487 |

*Primary Examiner*—Huyen Le
*Assistant Examiner*—Binh K. Tieu
*Attorney, Agent, or Firm*—Jones, Day, Reavis & Pogue

[57] ABSTRACT

A method and apparatus for prepaid phone card activation and billing is disclosed. Particularly, a method and apparatus for prepaid phone card activation and billing is disclosed, which provides benefits to a phone card client and to a phone card company. An improved phone card is disclosed that has a magnetic strip for encoding prepaid phone card information adapted for reading by a point of sale terminal. At the time an improved phone card is to be sold or otherwise transferred, the card may preferably be read through a point of sale terminal which may be in communication with a centralized computer. The centralized computer may compare information encoded on the card with information stored in a centralized database and with information from the point of sale terminal to verify that the card is being sold or otherwise transferred rightfully. The centralized computer may then authorize or deny activation of the card. Upon activation, the centralized computer or an invoicing computer may then prepare an invoice or automatically debit a client's bank account.

10 Claims, 2 Drawing Sheets

5,903,633

METHOD AND APPARATUS FOR PREPAID PHONE CARD ACTIVATION AND BILLING

This is a continuation-in-part of co-pending U.S. patent application Ser. No. 08/410,857, filed Mar. 27, 1995.

FIELD OF THE INVENTION

This invention relates to a method and apparatus for prepaid phone card activation and billing, and more specifically to a method and apparatus for prepaid phone card activation and billing which provides benefits to a phone card client and to a phone card company.

BACKGROUND OF THE INVENTION

Various methods and systems for the sale and use of prepaid telephone calls are well known in the telecommunications industry. For example, U.S. Pat. No. 4,706,275 describes the implementation and operation of a telephone system that allows for prepayment of telephone calls, wherein credit information and a special code for a specific account are stored in memory in special exchanges, and wherein the amount of prepaid minutes in that specific account are debited as a call, made using that special code, progresses. Such systems are well known in the telecommunications industry, and a detailed description is not provided herein. Special codes are typically referred to as Personal Identification Numbers, or PINs.

It is to be understood that the special code, or PIN, which enables an end user to access a specific account can be provided in various forms, such as on a label or a phone card. For example, a phone card company sells a plurality of phone cards with distinct PINs on each of the phone cards to a phone card client, such as a retailer, a vending machine operator, a promotional advertiser, etc. The phone card client will herein be referred to as the "client." These phone cards are then typically re-sold for long distance services at retail, sold as collectibles, or given away as promotional items, by the client to an end user.

Each PIN printed on each individual phone card corresponds to a specific account that is credited with a predetermined number of telephone call units, such as minutes. In some systems, the PIN is actually the account number, which corresponds to a control code that is issued with and identifies a particular phone card. In other words, in a preferred embodiment, each PIN is linked to a predetermined number of minutes of "talk time" and to a control code.

An end user generally purchases or receives a phone card from a client. It is also possible for an end user to purchase a phone card directly from a phone card company. To place a call, the end user typically calls a special phone number, and then enters the PIN along with the phone number the end user is trying to reach. The number of units remaining in a specific account is debited by the number of units spent by the end user on telephone calls.

However, there are significant drawbacks with the way that phone cards are currently being sold and activated. These drawbacks are a concern for both clients and the phone card company that sells the cards. One drawback relates to the procedure by which the client purchases the phone cards from the phone card company.

One method that has been used is for the client to order a shipment of phone cards and pay for the entire wholesale value of the shipment of phone cards when the cards are shipped or received. This method has particularly been used by clients that sell the cards through retail channels or distribute them through promotional giveaways. This method is particularly onerous for clients because they have to pay up front for the cards, even though the actual calls made using the card may not take place for quite some time, if at all.

One alternative to having the client prepay for the cards is described in the parent to this application, Ser. No. 08/410,857. That application discloses one method and apparatus whereby an invoice is sent to the client when individual phone cards are first used by an end user. Using that method and apparatus reduces the financial burden on the clients and ensures that clients are charged for the phone card units received only if the corresponding phone card units are used by an end user.

A second drawback of either of the above described methods for billing for phone cards relates to the activation of the cards. Under present distribution methods, as described above, individual cards are sent out with PINs printed on the cards themselves. These cards can be used immediately by whomever is in possession of them. For example, a person who obtains one of these "active" cards can simply call the phone number printed on the card, enter the PIN, and talk for the number of minutes that have been allocated to that PIN. Effectively, these cards have many of the properties of cash, in that they can be used by anyone in possession of them.

This distribution system has caused a number of problems in accounting for cards. Perhaps the most serious problem relates to the theft or other loss of these cards, and the subsequent unauthorized use of the cards by persons who possess them without having paid for them. For example, in a retail environment, the "active" cards must be carefully handled because of their small size and large value, to minimize theft. This special handling therefore limits the exposure that the cards can get throughout the store, necessarily limiting their sales potential. If it were possible to display these cards throughout the store without risking a significant financial loss, the card's sales potential would likely be enhanced.

Therefore, a better solution is needed to minimize the risk of wrongful use of these cards and the inherent financial burden that wrongful use has on the client and the phone card company. A new method and apparatus are needed that will account for the sale (or other rightful transfer) of cards from the client to the end user, and ensure that the cards are not activated until and unless they are rightfully obtained.

SUMMARY OF THE INVENTION

The method and apparatus of the present invention for phone card activation and billing provides clients and phone card companies with the benefits associated with the sale or distribution of phone cards, while reducing the associated drawbacks, such as the initial financial burden of prepaying for phone card units, the wasted cost of prepaying for phone card units that never get used by an end user, and the losses associated with the wrongful use of the cards.

The method and apparatus of the present invention for phone card activation and billing provides clients with phone cards having a PIN that identifies a specific account credited with a predetermined number of units, such as minutes. In this regard, the phone card used in this invention is similar to that used in the parent application. Under the new system, the phone card may have other codes, such as a control code, and the cards may not be usable when they are shipped to or received by a client. When shipped, the phone card account is not active, and may not be used until an authorization has been given from a centralized computer. The client may only be required to make a nominal up front payment to the phone card company to cover the cost of producing, packaging, and distributing the phone cards. The client may not be required to prepay the phone card company for the number of phone card units being purchased for re-sale or distribution to end users. The nominal up-front fee for the phone cards may be significantly less than the value of the phone card units associated with each of the PINs on the phone cards.

A novel feature of the present invention is the use of a magnetic strip on a prepaid phone card. This magnetic strip is similar to those used on credit cards and bank cards, and may be encoded with data that identifies the phone card, the retailer to whom it is shipped, the PIN, and other relevant information.

Prior to an individual phone card being sold or transferred, the retailer (or other client) may then swipe the phone card through a point of sale terminal, such as a Verifone or other cash register system. The point of sale terminal will read the data preferably encoded on the magnetic strip on the back of the phone card, and transmit that data through telephone lines to a centralized database residing on the centralized computer. Alternatively, the point of sale terminal may transmit the data to a client's host computer, which in turn transmits the data to the centralized computer. The data can either be transferred directly to the central database via an (800) number, or through a dedicated line or other means to the retailer's computer which may act as an intermediary to pass the transaction between the client and the centralized database. The information that is transmitted from the card may include the following, among others:

1. a PIN;

2. an 800 gateway number to which the PIN is pointed;

3. a control code that identifies, among other things, the card and the retailer to whom the card was shipped; and 4. an expiration date of the PIN, which may be based on the date of activation (e.g., activation plus six months), or any other factor as may be determined from time to time. Some of this information may also be printed on the card. Various alternatives are available as to how much of the above data is printed on the card, as described in more detail in the detailed description below.

The above information may then be processed and compared to information regarding the specific PIN that is already in the centralized database. Specifically, software will compare the information provided by the point of sale terminal to determine if the location of the point of sale terminal where the card is being swiped matches the client that is identified by the control code that is encoded on the magnetic strip of the card. This comparison is described in more detail in the detailed description, below. If the computer determines that the card was swiped through an authorized terminal at the correct client, then the PIN associated with that card may be activated, so that calls can be made using that card and PIN. At this point, the computer may return a code or message to the point of sale terminal, in much the same way that an approval code is sent at the end of a credit card transaction, confirming that the activation process was finished and the card is now usable. This code may consist of the last few digits of the PIN code or the control code, which may be completely or partially exposed on the card.

The transmission from the point of sale terminal when an end user purchases a phone card also serves a second purpose. It is this transmission that alerts the phone card company, through its centralized computer, that the individual card is passing from the client to the end user. Because the client may have only paid a nominal fee upon shipment of the cards to the client, the remaining portion, or in some cases all, of the wholesale price of the card needs to be invoiced, billed and paid. This billing system is different than the one disclosed in the parent to this application, Ser. No. 08/410,857. In the system described in that application, the event that triggers the invoicing for the card is actual use by the end user, independent of the transaction between the retailer and the end user. Using the method described herein, it is the transfer from the client to the end user and the card's activation that signals to the phone company that the card has changed hands. This activation of the card is evidence that the client has sold or otherwise intends to transfer the card.

Here, the centralized computer can download the activated PINs to an invoicing computer system and note the date when each phone card was activated by the above-described method. Upon receiving these activated PINs, the invoicing computer can then generate invoices which are then billed to the appropriate clients that sold or distributed the recently activated phone cards. In this way, the client is only billed for phone card units when the phone card units are activated. This method allows the client to closely match the timing of when they receive payment for the cards from the end user, and when they are liable to the phone card company for full payment of the wholesale price of the cards. It is to be understood that an invoice database, as described herein, is typically defined by a software program which categorizes data and then stores that categorized data onto a hard disk drive, or other equivalent storage device, in a manner well known in the computer art.

An end user that purchases or receives a phone card implementing the method and apparatus of the present invention will not notice anything different in their subsequent use of a phone card after the card has been activated. To place a call, the end user calls a special number, and then enters the PIN along with the phone number the end user is trying to reach. To the end user, the method and apparatus of the present invention for phone card billing resembles the prior art telephone systems. A call processing platform computer system verifies that the entered PIN is a valid PIN. When the entered PIN is verified, the end user's phone call is connected to the phone number dialed by the end user. Upon connection to the phone number dialed by the end user, the number of minutes remaining in the specific account corresponding to the entered PIN is debited by the number of minutes spent by the end user on telephone calls.

Accordingly, it is an object of the present invention to provide an improved method and apparatus for phone card activation.

It is a further object of the present invention to provide an improved method and apparatus for phone card billing.

It is a further object of the present invention to provide an improved prepaid phone card having a magnetic strip for encoded data.

It is a further object of the present invention to provide a method and apparatus for phone card activation and billing that reduces a client's initial financial burden by delaying payment for phone card units until the specific units are purchased by or otherwise transferred to an end user.

Further objects and advantages of the present invention will become apparent from a consideration of the drawings and ensuing description.

DETAILED DESCRIPTION OF A PREFERRED EMBODIMENT

Figure 1:
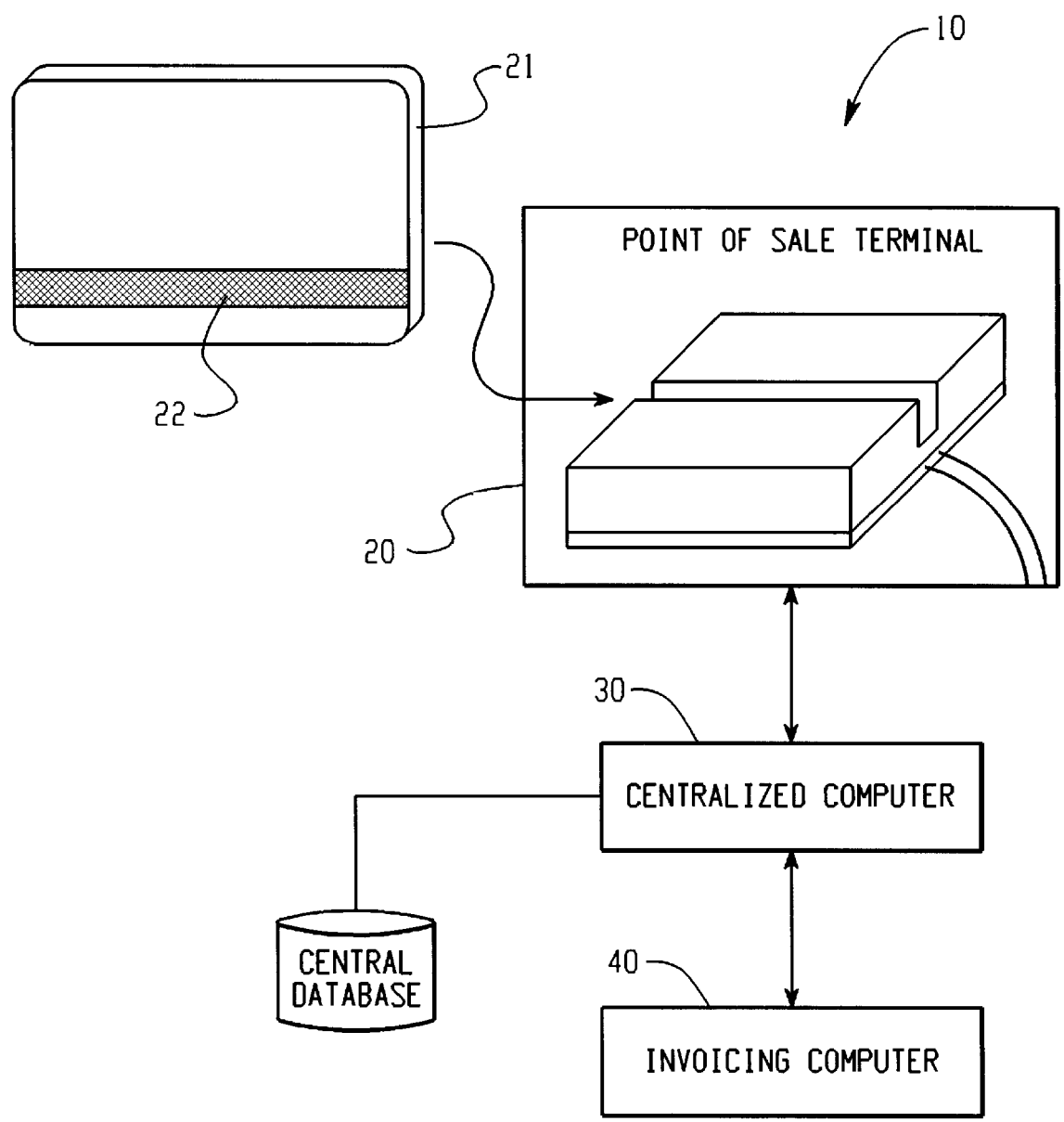
FIG. 1 is a block diagram of a phone card activation and billing system for implementing the method and apparatus of the present invention.
Figure 2:
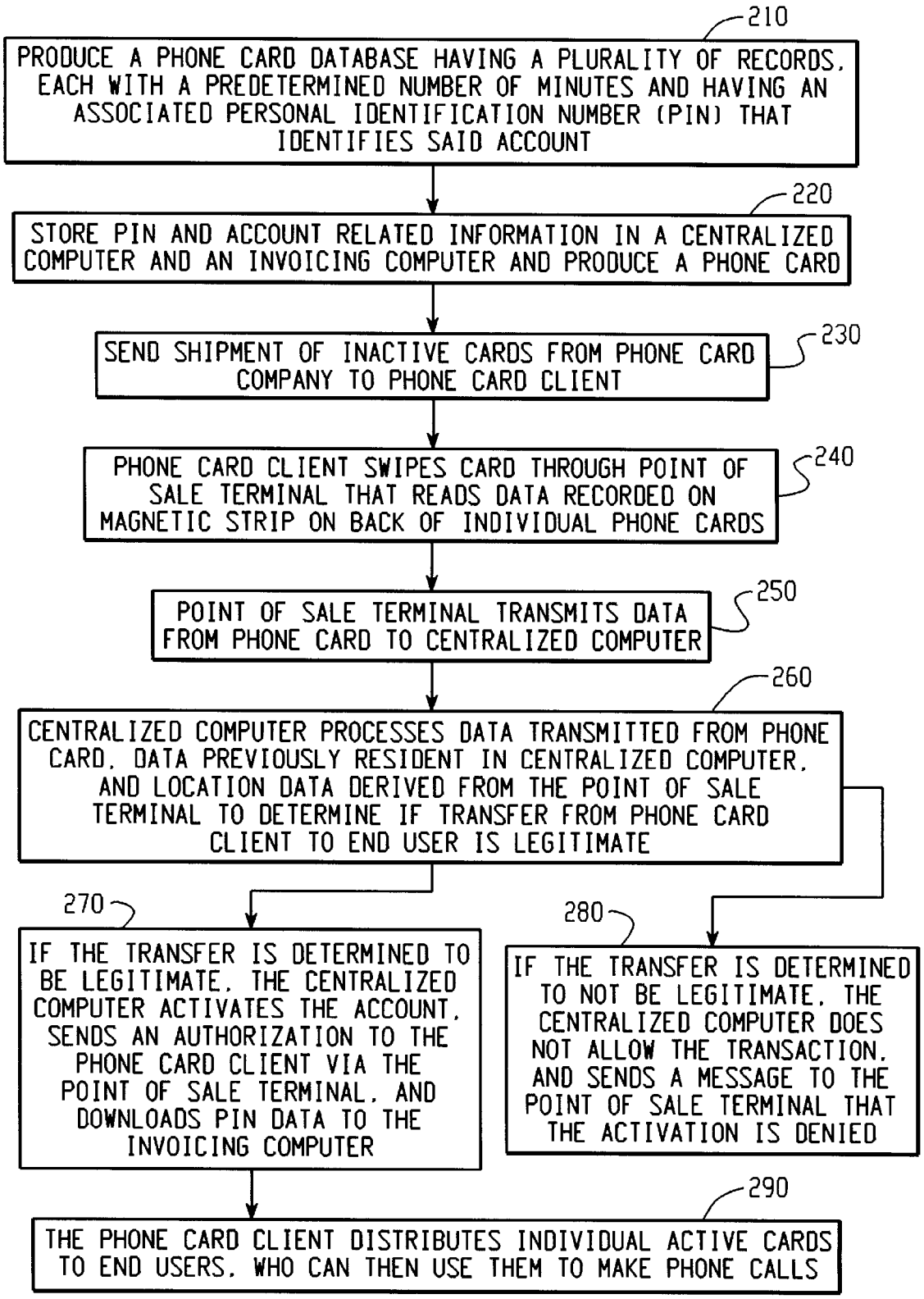
FIG. 2 is a flow chart illustrating steps in a preferred method of the present invention for phone card activation and billing.

FIG. 1 illustrates a preferred system 10 for implementing the method and apparatus of the present invention for prepaid phone card activation and billing. In FIG. 2, a flow chart is provided to illustrate a preferred method for practicing the present invention.

The preferred method generally has the following steps. First, a phone card company with access to a telephone system such as those known in the prior art, receives an order for a shipment of prepaid phone cards from a client. As used herein, the term "client" refers to a general class of potential phone card buyers, most of whom intend to act as middlemen and resell the prepaid phone cards to end users. For instance, the term client as used herein includes retailers, vending machine operators, promotional advertisers, and other similar individuals or companies. Further, the term client may apply herein to an end user where the end user deals directly with the phone company (rather than through a middleman) to purchase prepaid phone cards.

In response to a client order, the phone card company preferably produces a phone card database containing a plurality of records, each identified by a specific personal identification number (PIN) and each having a predetermined number of minutes assigned. The number of records preferably should match the number of phone cards ordered. This step is shown as 210 in FIG. 2.

Next, the database records described above are stored in a centralized database that may be accessed by a centralized computer 30 and an invoicing computer, as shown in step 220 in FIG. 2. Preferably, at or about the time that the records are being produced and recorded in the centralized database, a plurality of phone cards are being encoded with the necessary information. A novel feature of the present invention is the use of a magnetic strip on a phone card. This magnetic strip is similar to those used on credit cards and bank cards and is encoded with data. Preferably, the phone card company has phone cards having magnetic strips in inventory, awaiting customer orders. These phone cards preferably are purchased in advance, but at the time the order is received the magnetic strip has not been encoded with account information. Therefore, when an order is received, a plurality of phone cards can be encoded, each having account information that generally matches a single record identified by a specific PIN. Each of the now encoded phone cards preferably has, among other things, a control code identifying the specific client for whom it has been produced, a specific PIN to match the record having the same PIN, and a predetermined number of minutes credited to the account. At or near the time that the magnetic strip is being encoded, a client's company logo or other identifying material may be printed on the phone card. The PIN, control code, and predetermined number of minutes may be completely or partially printed on a visible portion of the phone card. Further, preferably an "800" number may be printed on the card for the end user to call in order to complete a call using the phone card. A preferred phone card 21 having a magnetic strip 22 is shown in FIG. 1.

For security reasons, portions of the PIN or the control code may be obscured until the card is transferred to the end user. Under one embodiment, the PIN consists of ten numeric characters. Preferably, six of those ten characters may be obscured by a thin, opaque covering that may be scratched off by the end user, in a manner similar to that used for lottery or other game pieces. Four of the ten characters may be exposed to view immediately. Alternatively, all or part of the PIN may be covered as described above. Having at least part of the PIN or the control code exposed is important in that it would then allow the client to verify that the card being swiped, as described below, matches the appropriate PIN or control number.

At this point, if a person attempted to use one of the phone cards to make a call, that attempt would be unsuccessful. The centralized computer may be programmed so that the account identified by a specific PIN would be inactive until an appropriate authorization has been made and the card is activated, as described below.

Next, the inactive phone cards are sent from the phone card company to the client, as shown in step 230. Preferably, the client at this point in time may be charged a nominal fee to cover the cost of producing and distributing the cards. This nominal amount preferably would be less than the wholesale price of the cards. By paying only a portion of the wholesale price of the cards, the client does not suffer the financial burden for phone cards that are never sold. Upon receipt by the client, the inactive cards are ready for purchase or other transfer to end users.

Prior to transferring a phone card to an end user, the retailer or other client must activate the card, which occurs by following steps 240–290 in FIG. 2. Each phone card has a magnetic strip formed on a back surface. The magnetic strip is encoded with a set of information, preferably including the following, a PIN, a control code that identifies the card and the client, an 800 gateway number to which the PIN is pointed, and the expiration date of the PIN, which may be based on the date of activation.

FIG. 1 shows a point of sale terminal 20 that can read the information from the magnetic strip. A point of sale terminal 20 is shown in communication with a centralized computer 30, which in turn is shown in communication with an invoicing computer 40. The modes of communication may be any of those known in the industry, whether the public switched telephone network, dedicated or private telephone networks or other networks, whether public or private.

The point of sale terminal is a terminal located at a client's facility, that generally allows sales and credit card data to be exchanged between the phone client and remote computers. Typically, a point of sale terminal is used to process credit card sales or to obtain check approvals from a bank against whom the checks are drawn. One example of a point of sale terminal is a Verifone, which can be used to process credit card data.

The point of sale terminal 20, as that term is used herein, is meant to describe a wide variety of transmitting and receiving devices that are used in recording sales and credit data. For example, some retailers have point of sale cash registers that are in communication with the retailer's own computers. The retailer computers may then be in electrical communication with the centralized computer 30 shown in FIG. 1, thereby completing an indirect connection from the actual location where the sale is made and the centralized computer 30.

A typical point of sale terminal 20, as used herein, should require no additional hardware in order to be used in connection with the new phone card activation and billing system. Normally, the necessary routines to initiate dialing out to the centralized computer and to return the necessary authorization to the point of sale terminal may be functionally built into the point of sale terminal.

In a manner that a typical point of sale terminal 20 operates, a client accesses the centralized computer 30 by calling a special number, typically a toll-free 800 number. Often the point of sale terminal 20 may be preprogrammed to call the centralized computer 30 with a swipe of a phone card or with one or more keystrokes. Alternatively, in the case of a retailer whose point of sale terminals are connected to the retailer's own computers, the retailer's computers may be programmed to call the centralized computer 30.

When a client is ready to sell or otherwise transfer a phone card to an end user, the client swipes a phone card through the point of sale terminal and initiates a communication with the centralized computer, as shown in step 240 of FIG. 2. Upon connection to the centralized computer 30, the point of sale terminal 20 transmits the data that is recorded on the magnetic strip on the phone card, as illustrated in step 250 of FIG. 2.

It is to be understood that the centralized computer 30 and the invoicing computer 40 each preferably comprise a hard disk drive for data storage, a microprocessor for processing, and random access memory for temporary data storage (components not shown). The operations of the centralized computer 30 and the invoicing computer 40 could alternatively be performed in one computer. The operation of a typical computer system for processing information is well known in the computer art, and is not discussed in further detail.

The centralized computer 30, processes the information read from the phone card, the information previously stored in the centralized database, and location data from the point of sale terminal to determine whether the person attempting to activate is indeed authorized to do so. This is shown in step 260 of FIG. 2. Primarily, it is determined whether the transmission from the point of sale terminal 20 is coming from the client who is identified by the control code on the card.

In this way, the system 10 may be used to minimize fraud. Because card theft is a major problem at the retail level, this system 10 may be used to prevent large scale fraud. For example, one type of fraud could occur where persons will set up a point of sale terminal specifically to defraud retail client's by activating cards with the retailer's control code on them. To prevent this, when retailer's contract to use the system 10, they will be able to provide a list of telephone numbers that support their point of sale terminals. The system 10 preferably utilizes Automatic Number Identification (ANI) technology, which enables the centralized computer to read the telephone number of the point of sale terminal initiating the transaction. If this telephone is not already "registered" in the database as being a valid number belonging to that retailer, the system 10 may then deny the activation.

If the transfer is determined to be legitimate, the centralized computer 30 activates the account and sends a message to the point of sale terminal 20. There are numerous ways to actually activate the account. The centralized computer can be programmed so that the account is inactive until the above steps have been taken. In this way, even if a person knew the proper PIN, the computer that processes calls (not shown here) may determine that the account was not active. Preferably, if the centralized computer 30 determines that all criteria have been met to activate the phone card, it can then transmit an authorization code to the point of sale terminal. This authorization code may consist of the four numeric characters of the PIN that are exposed on the preferred phone card. Alternatively, the authorization code may consist of a part or all of an exposed part of the control code, or a message of any sort. In either case, transmission of an authorization code gives the client a final check to make sure the correct card is being activated. In this way, the system may operate in a similar manner to credit card transactions, where retail clerks are given authorization codes prior to finalizing a transaction. This step is shown in FIG. 2 at step 270. At the same time, the centralized computer 30 may send a message to the invoicing computer 40, showing that the card has been transferred to an end user. The invoicing computer 40 can then bill the client for the phone card(s) activated. From this time forward, the billing system may be similar to that disclosed in the parent to this application, Ser. No. 08/410,857.

After the client activates a phone card, as disclosed above, the client can then transfer possession of the card to the end user, as shown in step 290 in FIG. 2.

If, however, it is determined that the attempted transfer is not legitimate, the centralized computer 30 will disallow the transaction, and the phone card will not be activated. At the same time, a message will be sent to the point of sale terminal stating that the attempted activation has been denied. This is shown in FIG. 2 at step 280.

After activation, the end user may use the card to make calls as long as the PIN is valid, has not expired, and as long as any minutes or other units remain in the corresponding account. If the PIN is valid and a sufficient number of units remain in the account, a special exchange connects the end user to the phone number dialed by the end user via a public exchange, in a manner well known in the telecommunications industry, and described in the parent to this application, Ser. No. 08/410,857.

The method and apparatus described above can further be used for a number of applications in addition to simple activation of a phone card. For example, the system 10 disclosed above can be used to add minutes to a phone card or to debit funds from a client's checking or other bank account to provide payment for retail sale of phone cards.

For instance, a retailer could swipe the card through the phone card terminal 20 and use the keypad on the terminal 20 to add additional minutes to the phone card. Preferably, the point of sale terminal could be programmed with a series of prompts to the client, inquiring as to whether the client desires to add minutes to the card, and if so to enter the desired number of minutes on the keypad. Appropriate safeguards could be followed in adding minutes in much the same fashion described above for the activation of new cards. In this scenario, an end user could pay the retailer for the added minutes, and the retailer could be billed in the manner described above for new cards.

Further, because the information encoded on the back of the phone card has a control code that identifies the client, the system 10 can automatically debit the client's checking or other bank account for the wholesale price of a card, less any nominal fees that may have been prepaid. Once a card has been activated, as described above, the centralized computer 30 and the invoicing computer could initiate a further dialout from the centralized database into appropriate banking networks to instantly debit the client's bank account.

While embodiments of the present invention have been shown and described, various modifications may be made without departing from the scope of the present invention, and all such modifications and equivalents are intended to be covered.

I claim:

1. An apparatus for prepaid phone card activation and billing between a phone card company and one or more phone card retailers, comprising:

at least one prepaid phone card having a magnetic strip encoded with account information that identifies a prepaid phone card record having a predetermined number of calling units;

a plurality of point of sale terminals operated by the one or more phone card retailers for scanning the encoded account information on said prepaid phone card and capable of sending and receiving transmissions from other communication devices;

a centralized computer operated by the phone card company in communications with said point of sale terminals for receiving and sending account information regarding said prepaid phone card and said prepaid phone card record, said centralized computer having access to a centralized database, said centralized database having a plurality of prepaid phone card records;

an invoicing computer operated by the phone card company in communication with said centralized computer and having means for processing invoices to the one or more phone card retailers, and a retailer host computer operated by the one or more phone card retailers in communication with said point of sale terminals and said centralized computer, said retailer host computer operating as an intermediate node for transmitting phone card activation information between said point of sale terminals and said centralized computer.

2. The apparatus of claim 1 wherein said calling units are denominated in monetary units.

3. The apparatus of claim 1 wherein said calling units are denominated in units of time.

4. A method for phone card activation comprising the following steps:

producing a plurality of phone card records, each record having a unique PIN and each record credited with a predetermined number of calling units usable toward making phone calls;

storing said phone card records in a centralized database;

encoding a plurality of prepaid phone cards, each having a magnetic strip adapted for encoding, with account information that identifies a prepaid phone card record having a predetermined number of calling units;

distributing said prepaid phone cards to retailers, providing at least one point of sale terminal for each retailer, the at least one point of sale terminal coupled to a retailer computer, wherein each point of sale terminal has an associated automated number identification code (ANI) that is transmitted when the point of sale terminal requests activation of a phone card;

storing the ANI code for each point of sale terminal in the centralized database;

scanning a prepaid phone card through a point of sale terminal to request activation of the phone card, transmitting the account information from the point of sale terminal to the centralized database through the retailer computer, said retailer computer operating as an intermediate node for transmitting phone card account information;

comparing the account information encoded on the magnetic strip from said prepaid phone card, information from said phone card record, the transmitted ANI code, and the ANI codes stored in the centralized database to determine whether the rightful retailer is in possession of said prepaid phone card;

sending an authorization code to said point of sale terminal if the rightful retailer is in possession of said prepaid phone card and activating the phone card account; and sending a denial code to said point of sale terminal if it cannot be determined that the rightful retailer is in possession of said prepaid phone card.

5. The method of claim 4 wherein said calling units are denominated in monetary units.

6. The method of claim 4 wherein said calling units are denominated in units of time.

7. A method for phone card activation comprising the following steps:

scanning a prepaid phone card through a point of sale terminal located at a client facility, said prepaid phone card having a magnetic strip encoded with account information that identifies a prepaid phone card record credited with a predetermined number of calling units stored in a centralized computer means, wherein the client facility includes a client host computer coupled to said point of sale terminal;

storing an automatic number identification (ANI) code for the point of sale terminal in the centralized computer means;

transmitting the account information from the point of sale terminal to the centralized computer means through the client host computer, said client host computer operating as an intermediate node for transmitting phone card account information;

comparing account information encoded on the magnetic strip adjacent said prepaid phone card, information from said phone card record, ANI information transmitted from said point of sale terminal, and the ANI code stored in the centralized computer means to determine whether the rightful client is in possession of said prepaid phone card;

if rightful client is in possession of said prepaid phone card, sending an authorization code to said point of sale terminal and activating the phone card account; and if it cannot be determined that the rightful client is in possession of said prepaid phone card, sending a denial code to said point of said terminal.

8. The method for phone card activation of claim 7, additionally adapted for phone card billing, and further comprising the following steps:

transmitting data from said centralized computer to an invoicing computer when an account is activated, and invoicing said client for activated prepaid phone card.

9. The method for phone card activation and billing of claim 8, further comprising the following step:

communicating with a banking network to debit said clients' bank account for payment for said prepaid phone card.

10. The apparatus of claim 1, further comprising:

means for storing automated number identification (ANI) codes for each of the plurality of point of sale terminals at the centralized computer; and means for comparing a transmitted ANI code from a point of sale terminal to a stored ANI code at the centralized computer to determine whether to activate a phone card.

* * * * *